United States Patent
Nakata

(10) Patent No.: US 10,673,687 B2
(45) Date of Patent: Jun. 2, 2020

(54) MONITORING APPARATUS, RELAY APPARATUS, RPL DECISION METHOD, AND NON-TRANSITORY COMPUTER READABLE MEDIUM STORING PROGRAM

(71) Applicant: NEC CORPORATION, Tokyo (JP)

(72) Inventor: Asami Nakata, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/083,708

(22) PCT Filed: Feb. 9, 2017

(86) PCT No.: PCT/JP2017/004788
§ 371 (c)(1),
(2) Date: Sep. 10, 2018

(87) PCT Pub. No.: WO2017/159142
PCT Pub. Date: Sep. 21, 2017

(65) Prior Publication Data
US 2019/0075015 A1  Mar. 7, 2019

(30) Foreign Application Priority Data
Mar. 18, 2016  (JP) .................... 2016-055964

(51) Int. Cl.
*H04L 12/24* (2006.01)
*H04L 12/437* (2006.01)

(52) U.S. Cl.
CPC ........ *H04L 41/0668* (2013.01); *H04L 12/437* (2013.01); *H04L 41/0896* (2013.01)

(58) Field of Classification Search
CPC ......... H04L 2012/1421; H04L 12/4637; H04L 41/0654–0672; H04L 45/22; H04L 47/13
See application file for complete search history.

(56) References Cited

U.S. PATENT DOCUMENTS

2014/0355447 A1  12/2014 Gohite et al.

FOREIGN PATENT DOCUMENTS

| JP | 2007-019683 A | 1/2007 |
| WO | 2012/091025 A1 | 7/2012 |
| WO | 2014/006847 A1 | 1/2014 |

OTHER PUBLICATIONS

ITU-T, G.8032/Y.1344, "Ethernet ring protection switching", Aug. 2015, pp. 1-82.
International Search Report of PCT/JP2017/004788 dated Apr. 25, 2017 [PCT/ISA/210].

*Primary Examiner* — Pao Sinkantarakorn
(74) *Attorney, Agent, or Firm* — Sughrue Mion, PLLC

(57) ABSTRACT

A monitoring apparatus (200) according to the present invention sets an RPL (Ring Protection Link) to each network apparatus constituting a communication network by ERP (Ethernet Ring Protection). The monitoring apparatus (200) includes an RPL deciding unit (201) for deciding an RPL based on a change in a bandwidth of a communication path. Thus, it is possible to provide a monitoring apparatus that can effectively use changing bandwidths.

5 Claims, 14 Drawing Sheets

MONITORING APPARATUS, RELAY APPARATUS, RPL DECISION METHOD, AND NON-TRANSITORY COMPUTER READABLE MEDIUM STORING PROGRAM

CROSS REFERENCE TO RELATED APPLICATIONS

This application is a National Stage of International Application No. PCT/JP2017/004788, filed Feb. 9, 2017, claiming priority based on Japanese Patent Application No. 2016-055964, filed Mar. 18, 2016, the contents of all of which are incorporated herein by reference in their entirety.

TECHNICAL FIELD

The present invention relates to a monitoring apparatus, a relay apparatus, an RPL (Ring Protection Link) determination method, and a program thereof. In particular, the present invention relates to a monitoring apparatus that sets an RPL to each network apparatus constituting a communication network by ERP (Ethernet (registered trademark) Ring Protection), an RPL decision method by the monitoring apparatus, a program thereof, and a relay apparatus.

BACKGROUND ART

ERP is a protocol for redundancy and loop prevention in an Ethernet (registered trademark) ring using Ether OAM (Operation Administration and Maintenance) (see Non Patent Literature 1).

ERP supporting only wired communication is known. In this ERP supporting only wired communication, a communication path is switched on condition that a link is down.

Further, Patent Literature 1 discloses a technique in which, when a difference between an uplink speed and a downlink speed is equal to or greater than a threshold between wireless communication apparatuses, it is determined whether a communication failure has occurred in wireless communication in any of communication directions, path cost is changed and recalculated using a line speed for the wireless communication, on which the determination of the communication direction is made, and STP (Spanning Tree Protocol) path control is performed based on the path cost.

CITATION LIST

Non Patent Literature

Non Patent Literature 1: "G.8032/Y.1344 Ethernet ring protection switching", ITU-T, August 2015.

Patent Literature

Patent Literature 1: International Patent Publication No. WO2012/091025

SUMMARY OF INVENTION

Technical Problem

In wireless communication, a physical bandwidth of a link changes depending on an external environment. For this reason, when wireless communication is supported by ERP, it is not possible to respond to a change in the physical bandwidth of the link only by switching a communication path on the condition that the link is down. Thus, there has been a problem that, when the physical bandwidth of the link degrades due to the external environment, the communication path is not switched, and the transmission rate is reduced, even when a link with favorable physical bandwidth is present.

Further, the technique disclosed in Patent Literature 1 is not related to ERP. In the technique disclosed in Patent Literature 1, when the difference between the uplink speed and the downlink speed is equal to or greater than the threshold, it is determined that a communication failure has occurred, and the path is forcibly switched. Therefore, even when an available bandwidth remains in the degraded wireless link, communication cannot be performed using such a bandwidth.

The present invention has been made to solve such a problem. An object of the present invention is to provide a monitoring apparatus, a relay apparatus, an RPL decision method, and a program thereof that can effectively utilize changing bandwidths.

Solution to Problem

A first example aspect of the present invention is a monitoring apparatus for setting an RPL (Ring Protection Link) to each network apparatus constituting a communication network by ERP (Ethernet Ring Protection). The monitoring apparatus includes RPL deciding unit for deciding an RPL based on a change in a bandwidth of a communication path.

A second example aspect of the present invention is an RPL decision method in a monitoring apparatus for setting an RPL (Ring Protection Link) to each network apparatus constituting a communication network by ERP (Ethernet Ring Protection). The RPL decision method includes a step of deciding an RPL based on a change in a bandwidth of a communication path.

A third example aspect of the present invention is a non-transitory computer readable medium storing a program for causing a computer to execute an RPL decision method in a monitoring apparatus for setting an RPL (Ring Protection Link) to each network apparatus constituting a communication network by ERP (Ethernet Ring Protection). The RPL decision method includes a step of deciding an RPL based on a change in a bandwidth of a communication path.

A fourth example aspect of the present invention is a relay apparatus performing wireless communication with P2P (Point to Point) using adaptive modulation, wherein the relay apparatus transmits information about a modulation scheme to a monitoring apparatus, and receives an RPL (Ring Protection Link) based on the modulation scheme from the monitoring apparatus.

Advantageous Effects of Invention

The present invention can provide a monitoring apparatus, a relay apparatus, an RPL decision method, and a program thereof that can effectively utilize changing bandwidths.

DESCRIPTION OF EMBODIMENTS

First Embodiment

Hereinafter, embodiments of the present invention will be described with reference to the drawings. Firstly, a configuration of a network system according to a first embodiment of the present invention will be described with reference to the block diagram of FIG. 1. The network system according to the first embodiment of the present invention includes a network apparatus A101, a network apparatus B102, a network apparatus C103, a network apparatus D104, and a monitoring apparatus 200 connected to each network apparatus.

Figure 1:
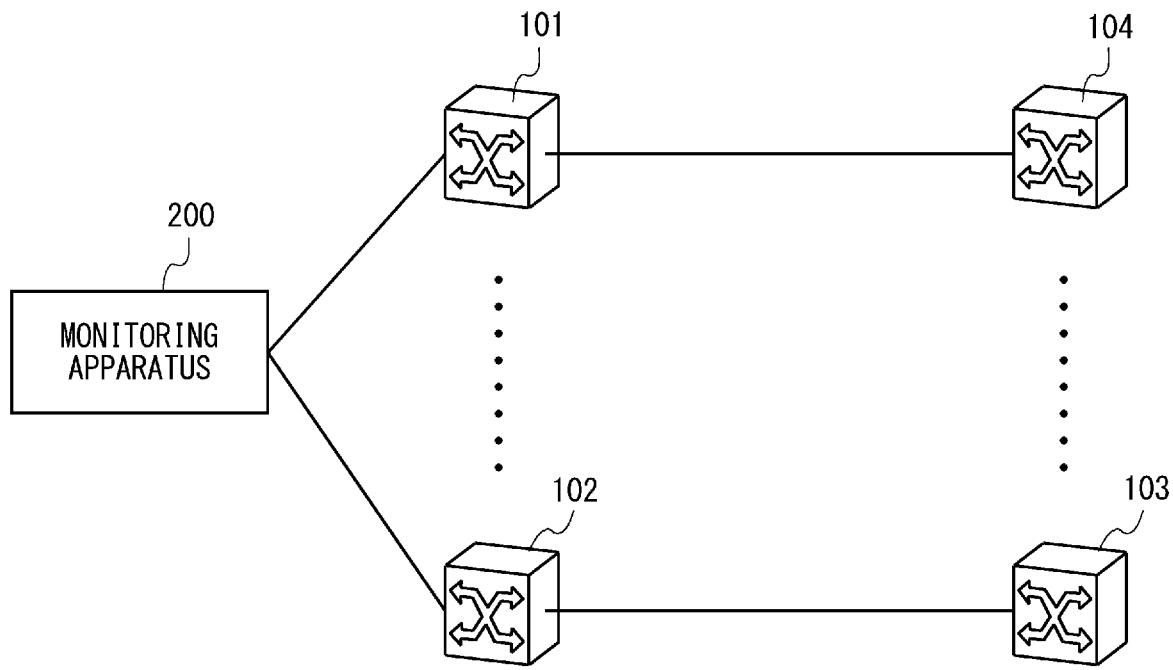
FIG. 1 is a block diagram showing a configuration of a network system according to a first embodiment of the present invention.

Each network apparatus is, for example, a relay apparatus such as a switch or a router constituting a network, and is an apparatus capable of forming an Ethernet ring with EPR. Each network apparatus includes one or more ports and is connected to another network apparatus or the monitoring apparatus 200 to exchange information. In the example of FIG. 1, a connection between the network apparatus A101 and the network apparatus D104 and a connection between the network apparatus B102 and the network apparatus C103 are wired links. A connection between the network apparatus A101 and the network apparatus B102 and a connection between the network apparatus C103 and the network apparatus D104 are wireless links. A link between the network apparatus A101 and the network apparatus B102 is referred to as an inter-AB link. Likewise, a link between the network apparatus B102 and the network apparatus C103 is referred to as an inter-BC link, a link between the network apparatus C103 and the network apparatus D104 is referred to as an inter-CD link, and a link between the network apparatus D104 and the network apparatus A101 is referred to an inter-DA link.

The monitoring apparatus 200 is connected to each network apparatus and, for example, monitors and controls the network apparatuses to be managed, which have been set in advance. The monitoring apparatus 200 is, for example, an NMS (Network Management System). Note that the monitoring apparatus 200 is not limited to an NMS, and may be any device as long as it can, for example, monitor and control each network apparatus.

Figure 2:
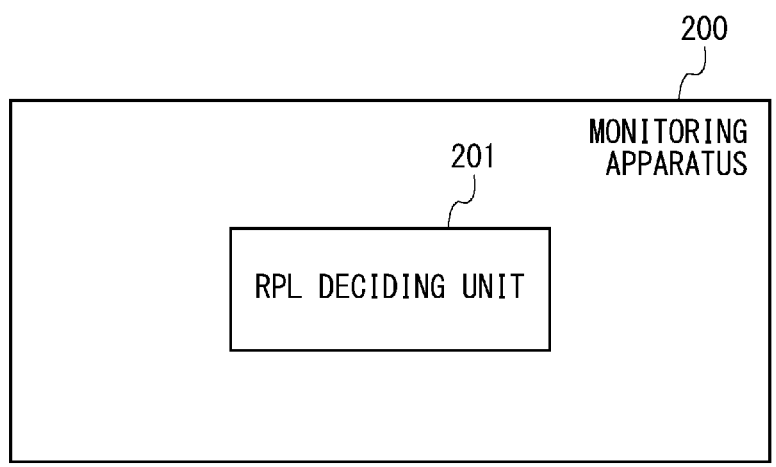
FIG. 2 is a block diagram showing a configuration of a monitoring apparatus according to the first embodiment of the present invention.

Next, a configuration of the monitoring apparatus according to the first embodiment of the present invention will be described with reference to the block diagram of FIG. 2. The monitoring apparatus 200 includes an RPL deciding unit 201.

The RPL deciding unit 201 has a function of deciding an RPL based on a change in the bandwidth of the communication path. The function of deciding the RPL based on the change in the bandwidth of the communication path will be described with reference to FIGS. 3 and 4.

Figure 3:
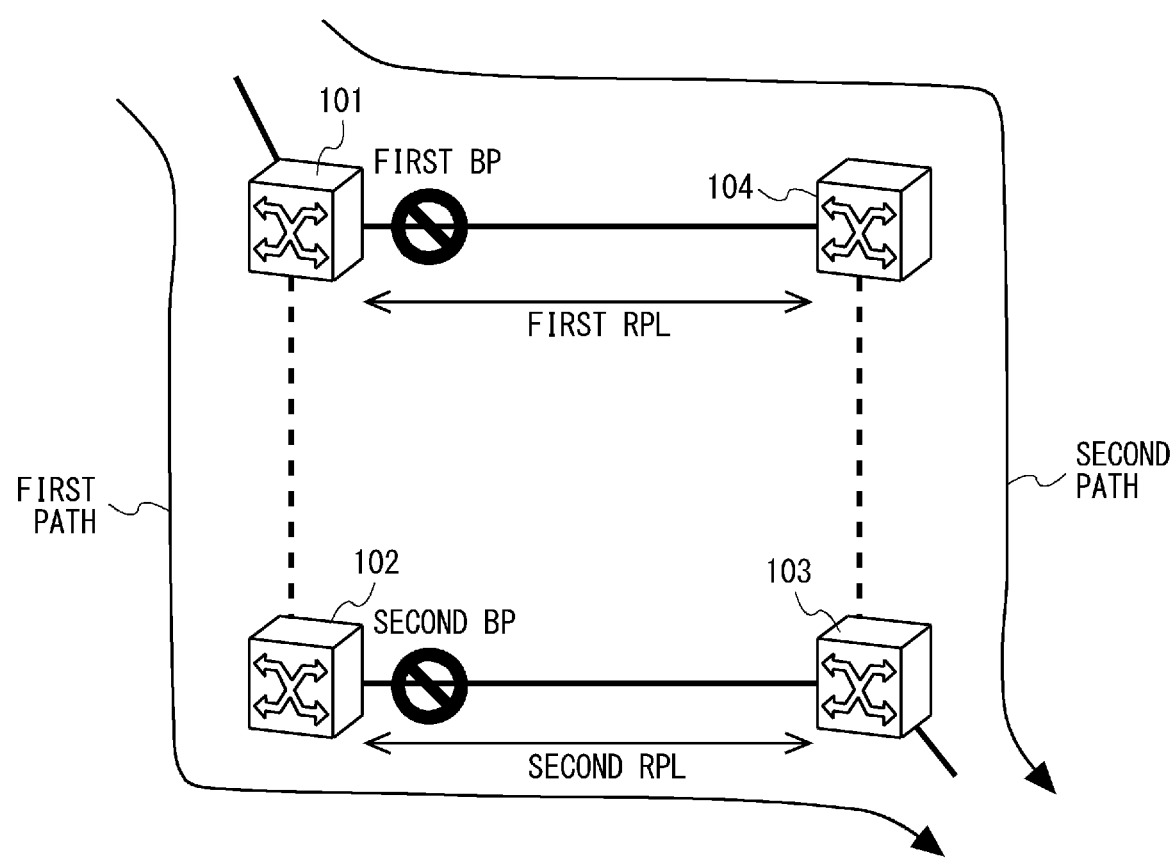
FIG. 3 is a diagram showing an example of a state before a link degrades according to the first embodiment of the present invention.

FIG. 3 is a diagram showing a state before a link degrades. In FIG. 3, a first path is set as a path from the network apparatus A101 to the network apparatus C103 via the network apparatus B102. A second path is set to a path from the network apparatus A101 to the network apparatus C103 via the network apparatus D104. In the first path and the second path, the network apparatus A101, which is a transmission source, is referred to as a source node. Likewise, in the first path and the second path, the network apparatus C103, which is a destination, is referred to as a destination node. The bandwidth used by the first path is 250 Mbps, and the bandwidth used by the second path is 50 Mbps.

In FIG. 3, an RPL of the counterclockwise first path is set to the inter-DA link. Further, the RPL of the clockwise second path is set to the inter-BC link. The RPL of the first path is referred to as a first RPL, and the RPL of the second path is referred to as a second RPL. BPs (Blocking Ports) are set to a port of the network apparatus A101 in the first RPL and a port of the network apparatus B102 in the second RPL. The BP in the first RPL is referred to as a first BP, and the BP in the second RPL is referred to as a second BP.

In the state of FIG. 3, suppose that the physical bandwidth of the inter-AB link has degraded from 300 Mbps to 50 Mbps. At this time, the RPL deciding unit 201 decides the RPL based on the change in the bandwidth of the communication path.

Specifically, the RPL deciding unit 201 decides whether to keep the first RPL as the inter-DA link or to change the first RPL to the inter-AB link based on the change in the physical bandwidth of the inter-AB link. For example, when 250 Mbps, which is a bandwidth used by the first path, can be passed through the inter-AB link and the inter-BC link, the RPL deciding unit 201 decides not to change the first RPL. That is, the RPL deciding unit 201 decides not to change the first RPL when it evaluates that the transmission rate will not be reduced even without changing the first RPL setting based on the change in the physical bandwidth of the communication path and the bandwidth used for the communication.

On the other hand, when it is not possible to pass 250 Mbps, which is the bandwidth used by the first path, through the inter-AB link and the inter-BC link, the RPL deciding unit 201 decides as follows. When 250 Mbps, which is the bandwidth used by the first path, can be passed through the inter-DA link and the inter-CD link, the RPL deciding unit 201 decides to change the first RPL to the inter-AB link. On the other hand, when 250 Mbps, which is the bandwidth used by the first path, cannot be passed through the inter-DA link and the inter-CD link, the RPL deciding unit 201 evaluates whether the inter-AB link and the inter-BC link or the inter-DA link and the inter-CD link have a smaller loss of the bandwidth used. Then, the first RPL is decided in such a way that the first path passes through the path with a smaller loss. In other words, the RPL deciding unit 201 decides the link to which the first RPL is set when it evaluates that the transmission rate will be reduced unless the first RPL setting is changed based on the change in the physical bandwidth of the communication path and the bandwidth used by the traffic.

In this example, the physical bandwidth of the inter-AB link has degraded from 300 Mbps to 50 Mbps. Thus, it is not possible to pass 250 Mbps, which is the bandwidth used by the first path, through the inter-AB link and the inter-BC link. Further, the physical bandwidth of the inter-DA link and the inter-CD link has not degraded, and thus it is possible to pass 250 Mbps, which is the bandwidth used by the first path. For this reason, the RPL deciding unit 201 decides the link to which the first RPL is set to the inter-AB link.

Figure 4:
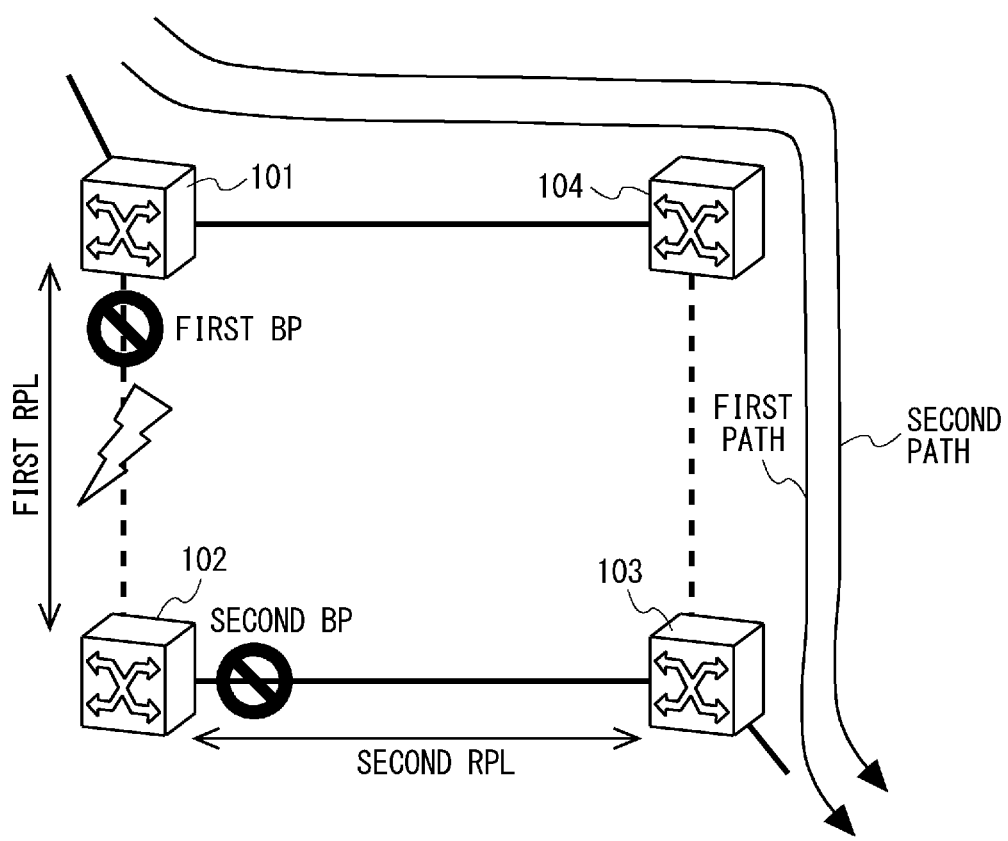
FIG. 4 is a diagram showing an example of a state after re-setting an RPL according to the first embodiment of the present invention.

Then, a first BP is set to a port of the network apparatus A101 in the inter-AB link, which is the first RPL. Thus, as shown in FIG. 4, both the first path and the second path pass through the path from the network apparatus A101 to the network apparatus C103 via the network apparatus D104.

As described above, the monitoring apparatus 200 according to the first embodiment includes the RPL deciding unit 201 that decides the RPL based on the change in the bandwidth of the communication path. This enables changing bandwidths to be effectively used.

In addition, the RPL deciding unit 201 according to the first embodiment may be configured to decide not to change the RPL when it evaluates that the transmission rate will not be reduced even without changing the RPL setting based on the change in the physical bandwidth of the communication path and the bandwidth used by the traffic, whereas it may be configured to decide the link to which the RPL is set when it evaluates that the transmission rate will be reduced unless the RPL setting is changed. In this case, it is possible to set the RPL in view of whether the transmission rate is reduced, and in view of a loss of the bandwidth used.

Second Embodiment

Figure 5:
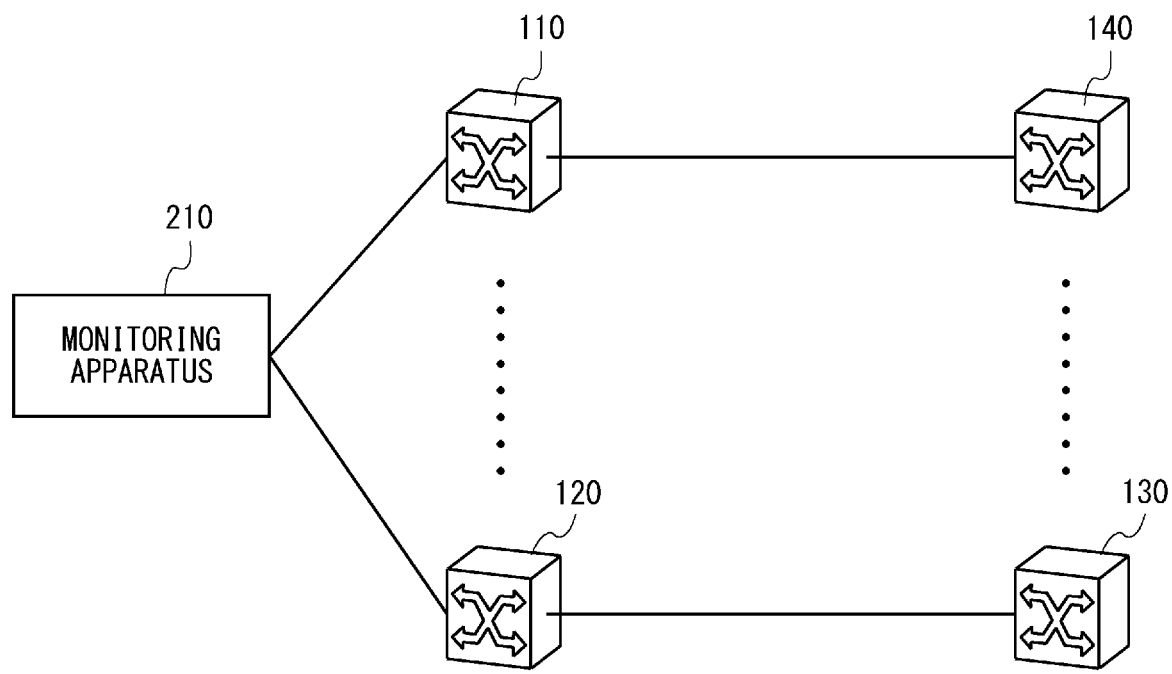
FIG. 5 is a block diagram showing a configuration of a network system according to a second embodiment of the present invention.

Next, a network system according to a second embodiment of the present invention will be described. The network system according to the second embodiment is a specific example of the network system according to the first embodiment. FIG. 5 is a block diagram showing a configuration of the network system according to the second embodiment. The network system according to the second embodiment includes a network apparatus A110, a network apparatus B120, a network apparatus C130, a network apparatus D140, and a monitoring apparatus 210.

Figure 6:
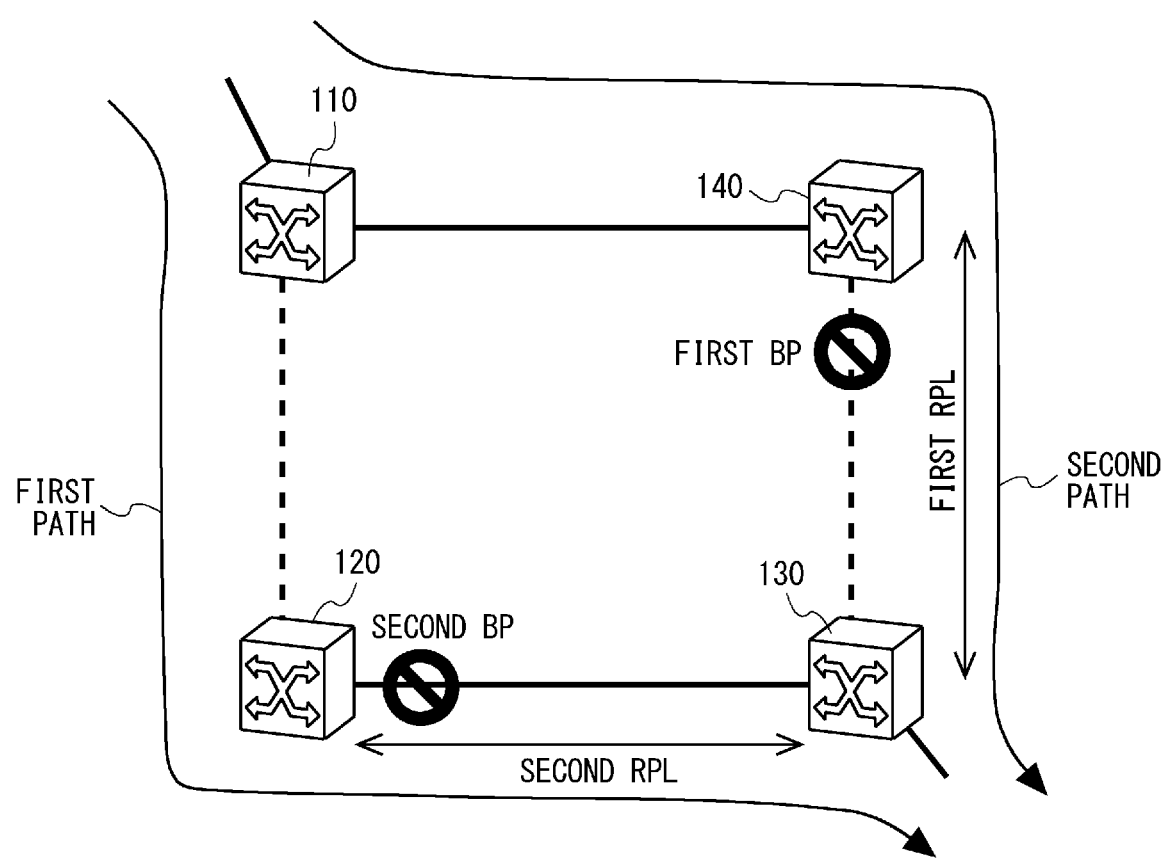
FIG. 6 is a diagram showing an example of a state before a link degrades according to the second embodiment of the present invention.

FIG. 6 is a diagram showing a state before a link deteriorates. In FIG. 6, an inter-DA link and an inter-BC link are wired links, and an inter-AB link and an inter-CD link are wireless links. The physical bandwidth of the wired link is 1000 Mbps, and the physical bandwidth of the wireless link is 300 Mbps.

In FIG. 6, a first RPL is set to the inter-CD link. Further, a second RPL is set to the inter-BC link. Moreover, a first BP is set to a port of the network apparatus D140 in the first RPL, and a second BP is set to a port of the network apparatus B120 in the second RPL.

Moreover, in FIG. 6, a first path is set to a path from the network apparatus A110 to the network apparatus C130 via the network apparatus B120. A second path is set to a path from the network apparatus A110 to the network apparatus C130 via the network apparatus D140. The bandwidth used by the first path is 250 Mbps, and the bandwidth used by the second path is 50 Mbps.

Figure 7:
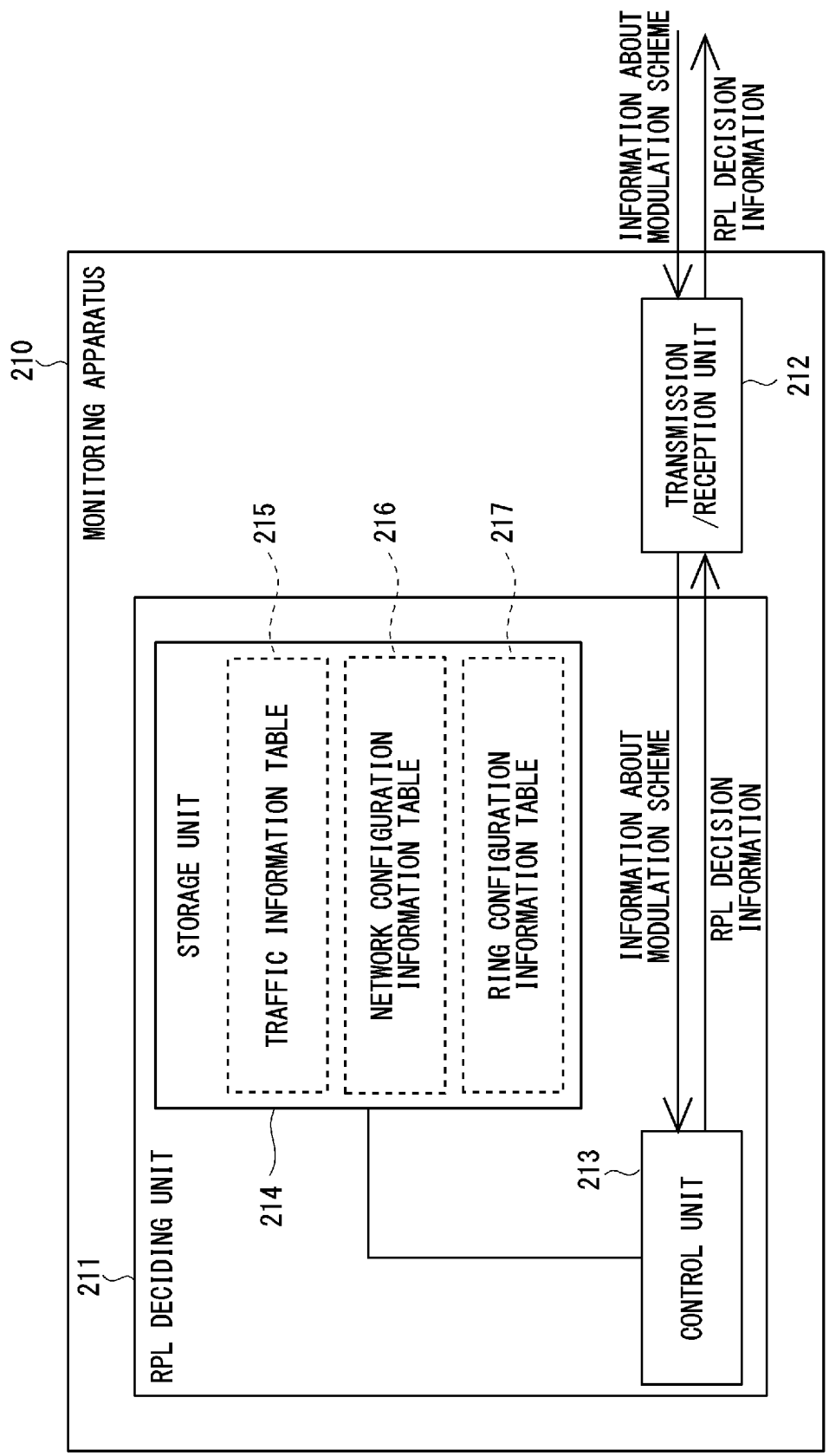
FIG. 7 is a block diagram showing a configuration of a monitoring apparatus according to the second embodiment of the present invention.

FIG. 7 is a block diagram showing a configuration of the monitoring apparatus 210 according to the second embodiment. The monitoring apparatus 210 includes an RPL deciding unit 211 and a transmission/reception unit 212.

The transmission/reception unit 212 receives information about a modulation scheme from the network apparatus A110, the network apparatus B120, the network apparatus C130, and the network apparatus D140. Further, the transmission/reception unit 212 outputs the received information about the modulation scheme to the RPL deciding unit 211.

The information about the modulation scheme will now be described. Each of the network apparatus A110, the network apparatus B120, the network apparatus C130, and the network apparatus D140 has a function of performing Adaptive Modulation. Thus, these network apparatuses change the multi-value number of the adaptive modulation according to the states of the wireless links and the like. The bandwidth changes due to a change in the multi-value number or the like. Then, the network apparatus transmits the information about the modulation scheme to the monitoring apparatus 210 in order to notify the monitoring apparatus of the change in the multi-value number of the adaptive modulation. The information about the modulation scheme is, for example, information including the multi-value number of the adaptive modulation or the change in the multi-value number of the adaptive modulation. The information about the modulation scheme also includes link identification information for identifying the link in which the multi-value number of the adaptive modulation has changed.

The RPL deciding unit 211 includes a control unit 213 and a storage unit 214. The storage unit 214 includes a traffic information table 215, a network configuration information table 216, and a ring configuration information table 217.

When the control unit 213 receives the information about the modulation scheme from the transmission/reception unit 212, it extracts the wireless link in which the multi-value number of the modulation has changed based on the information about the modulation scheme, and calculates the physical bandwidth of the wireless link. Specifically, the wireless link in which the multi-value number of the modulation has changed is extracted based on the link identification information included in the information about the modulation scheme. The physical bandwidth of the wireless link is calculated from the multi-value number of the adaptive modulation included in the information about the modulation scheme. The control unit 213 updates the physical bandwidth of the changed wireless link in the network configuration information table 216 with the calculated physical bandwidth.

When it is found, from the calculated physical bandwidth of the wireless link, that the physical bandwidth of the wireless link has degraded, the control unit 213 reads the bandwidth used by the traffic passing through the degraded wireless link from the traffic information table 215 of the storage unit 214. Further, the control unit 213 compares the physical bandwidth of the degraded wireless link with the bandwidth used. When a result of the comparison shows that the bandwidth used by the degraded wireless link is less than or equal to the physical bandwidth, the control unit 213 decides not to change the RPL. When the bandwidth used by the degraded wireless link is greater than the physical bandwidth, the control unit 213 reads, from the storage unit 214, traffic information, physical bandwidth information, and ring configuration information in the ring to which the degraded wireless link belongs. Specifically, the control unit 213 reads the traffic information, the physical bandwidth information, and the ring configuration information from the traffic information table 215, the network configuration information table 216, and the ring configuration information table 217, respectively.

Figure 8:
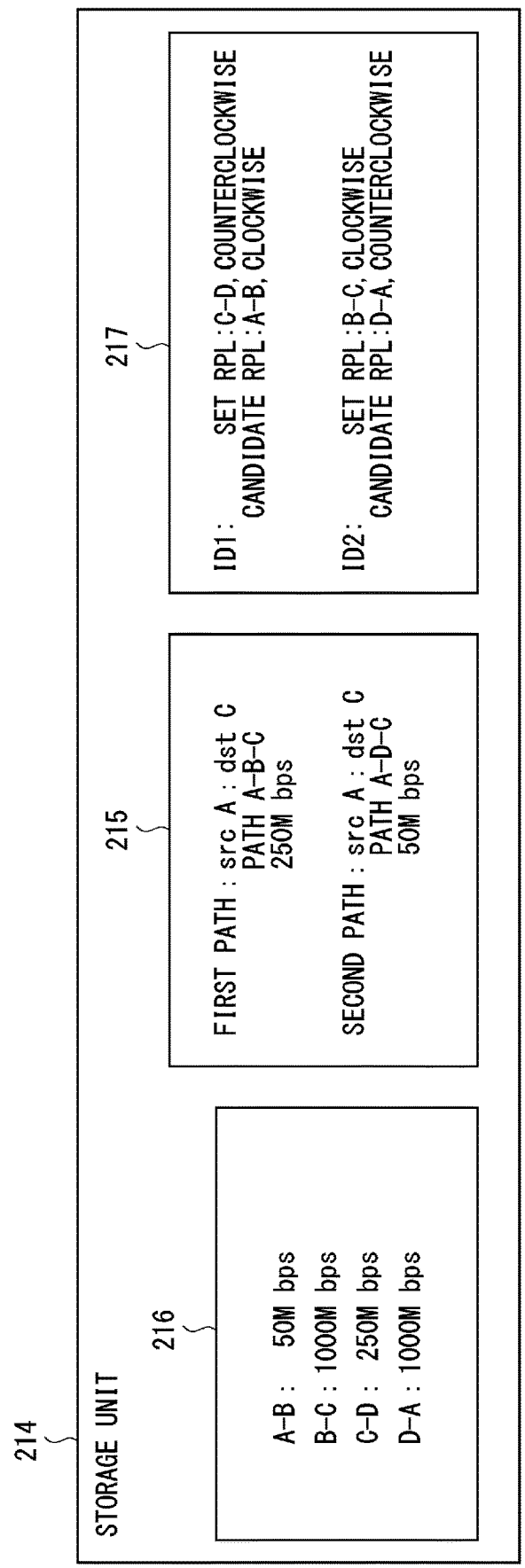
FIG. 8 is a diagram showing an example of each table included in a storage unit of the monitoring apparatus according to the second embodiment of the present invention.

An example of each table included in the storage unit 214 will be described with reference to FIG. 8.

The traffic information table 215 stores a source node, a destination node, a path, and a bandwidth used as the traffic information for each path. In FIG. 8, the source node is indicated by src, and the destination node is indicated by dst. In the example of FIG. 8, the source node: A, the destination node: C, the path: A-B-C, and the bandwidth used: 250 Mbps are stored as the traffic information of the first path. Further, the source node: A, the destination node: C, the path: A-D-C, and the used bandwidth: 50 Mbps are stored as the traffic information of the second path. In this case, A, B, C, and D indicate the network apparatuses A110, the network apparatus B120, the network apparatus C130, and the network apparatus D140, respectively.

The network configuration information table 216 stores the physical bandwidths of the respective links as the physical bandwidth information. In the example of FIG. 8, the network configuration information table 216 stores A-B: 50 Mbps, B-C: 1000 Mbps, C-D: 250 Mbps, and D-A: 1000 Mbps. In this case, A-B, B-C, C-D, and D-A indicate the inter-AB link, the inter-BC link, the inter-CD link, and the DA link, respectively. In the example of FIG. 8, the inter-AB link is updated from 300 Mbps to 50 Mbps, and the inter-CD link is updated from 300 Mbps to 250 Mbps due to the degradation of the wireless links.

The ring configuration information table 217 stores, for each ring instance as the ring configuration information, the set RPL, a communication direction when this RPL is set, a candidate RPL, and a communication direction when the candidate RPL is set. The set RPL here indicates the currently set RPL. Further, the candidate RPL indicates an RPL that is not currently set but can be set. In the example of FIG. 8, the ring configuration information table 217 stores, as a ring configuration information for ID1, which is a ring instance of the first path, the set RPL: C-D, counterclockwise, candidate RPL: A-B, and clockwise. The ring configuration information table 217 stores, as the ring configuration information for ID2, which is a ring instance of the second path, the set RPL: B-C, clockwise, candidate RPL: D-A, and counterclockwise.

Returning to FIG. 7, the description continues. The control unit 213 extracts all the RPLs related to each path based on the ring configuration information. In the example of FIG. 8, the RPLs related to the first path are C-D and A-B, and the RPLs related to the second path are B-C and D-A. Further, the control unit 213 obtains all combinations between the respective paths and the extracted RPLs. All combinations between the respective paths and the extracted RPLs are shown in Table 1.

TABLE 1

| Combination | Path | RPL |
|---|---|---|
| 1 | 1 | C-D |
|   | 2 | D-A |
| 2 | 1 | C-D |
|   | 2 | B-C |
| 3 | 1 | A-B |
|   | 2 | D-A |
| 4 | 1 | A-B |
|   | 2 | B-C |

In this example, there are four combinations between the respective paths and RPLs. In the combination 1, the first RPL is C-D, and the second RPL is D-A. In the combination 2, the first RPL is C-D, and the second RPL is B-C. In combination 3, the first RPL is A-B, and the second RPL is D-A. In the combination 4, the first RPL is A-B, and the second RPL is B-C.

The control unit 213 calculates a loss for each combination. The loss indicates a bandwidth used, which cannot achieve a bandwidth necessary for the traffic and drops. Specifically, the control unit 213 calculates the loss for each combination based on the traffic information, the physical bandwidth information, and the ring configuration information. The relationship between the respective combinations and losses is shown in Table 2. The unit of the loss is Mbps.

TABLE 2

| Combination | Path | RPL | Loss | Sum of loss |
|---|---|---|---|---|
| 1 | 1 | C-D | 200 | 250 |
|   | 2 | D-A | 50 |  |
| 2 | 1 | C-D | 200 | 200 |
|   | 2 | B-C | 0 |  |
| 3 | 1 | A-B | 0 | 0 |
|   | 2 | D-A | 0 |  |
| 4 | 1 | A-B | 0 | 50 |
|   | 2 | B-C | 50 |  |

In the first path of the combination 1, the RPL is C-D, and the communication direction is counterclockwise according to the ring configuration information. Thus, the first path of the combination 1 passes through the inter-AB link and the inter-BC link. The bandwidth used by the first path in the traffic information is 250 Mbps. The physical bandwidth of the inter-AB link is 50 Mbps, and the physical bandwidth of the inter-BC link is 1000 Mbps. Thus, the first path of the combination 1 can pass only 50 Mbps of 250 Mbps of the bandwidth used through the inter-AB link, with a loss of 200 Mbps.

In the second path of the combination 1, the RPL is D-A, and the communication direction is counterclockwise according to the ring configuration information. Thus, the second path of the combination 1 passes through the inter-AB link and the inter-BC link like the first path of the combination 1. The bandwidth used by the second path in the traffic information is 50 Mbps. Further, the physical bandwidth of the inter-AB link, which is 50 Mbps, has already been used in the first path, and thus the remaining physical bandwidth is 0 Mbps. Therefore, the second path of the combination 1 cannot pass 50 Mbps of the used bandwidth at all through the inter-AB link, with a loss of 50 Mbps.

Accordingly, the sum of the losses of the combination 1 is 250 Mbps, which is obtained by adding 200 Mbps and 50 Mbps.

In the first path of the combination 2, the RPL is C-D. Thus, like the first path of the combination 1, the loss is 200 Mbps.

In the second path of the combination 2, the RPL is B-C, and the communication direction is clockwise according to the ring configuration information. Thus, the second path of the combination 2 passes through the inter-DA link and the inter-CD link. The bandwidth used by the second path in the traffic information is 50 Mbps. The physical bandwidth of the inter-DA link is 1000 Mbps, and the physical bandwidth of the inter-CD link is 250 Mbps. Thus, the second path of the combination 2 passes through the inter-DA link and the inter-CD link without a loss.

Accordingly, the sum of the losses of the combination 2 is 200 Mbps, which is obtained by adding 200 Mbps and 0 Mbps.

In the first path of the combination 3, the RPL is A-B, and the communication direction is clockwise according to the ring configuration information. Therefore, the first path of the combination 3 passes through the inter-DA link and the inter-CD link. The bandwidth used by the first path in the traffic information is 250 Mbps. The physical bandwidth of the inter-DA link is 1000 Mbps, and the physical bandwidth of the inter-CD link is 250 Mbps. Thus, the first path of the combination 3 passes through the inter-DA link and the inter-CD link without a loss.

In the second path of the combination 3, the RPL is D-A, and the communication direction is counterclockwise according to the ring configuration information. Therefore, the second path of the combination 3 passes through the inter-AB link and the inter-BC link. The bandwidth used by the second path in the traffic information is 50 Mbps. The physical bandwidth of the inter-AB link is 50 Mbps, and the physical bandwidth of the inter-BC link is 1000 Mbps. Thus, the second path of the combination 3 passes through the inter-AB link and the inter-BC link without a loss.

Accordingly, the sum of the losses of the combination 3 is 0 Mbps, which is obtained by adding 0 Mbps and 0 Mbps. That is, no loss is generated in the combination 3.

In the first pass of the combination 4, the RPL is A-B. Thus, like the first path of the combination 3, no loss is generated.

In the second path of the combination 4, the RPL is B-C, and the communication direction is clockwise according to the ring configuration information. Therefore, the second path of the combination 4 passes through the inter-DA link and the inter-CD link. The bandwidth used by the second path in the traffic information is 50 Mbps. The physical bandwidth of the inter-DA link is 1000 Mbps, and the physical bandwidth of the inter-CD link is 250 Mbps. However, the physical bandwidth of 250 Mbps of the inter-CD link has already been used in the first path, and thus the remaining physical bandwidth is 0 Mbps. Therefore, the second path of the combination 4 cannot pass 50 Mbps of the used bandwidth at all through the inter-CD link, with a loss of 50 Mbps.

Accordingly, the sum of the losses of the combination 4 is 50 Mbps, which is obtained by adding 0 Mbps and 50 Mbps.

The control unit 213 selects the combination with the least loss. In the example of Table 2, the combination 3 is selected. In the example of Table 2, the combination 3 in which the sum of the loss is 0 Mbps is selected. However, the control unit 213 selects the combination with the least loss even when there is no combination having the sum of the loss of 0 Mbps. For example, when the combination having the sum of the loss of 50 Mbps is the combination having the least loss, this combination is selected.

The control unit 213 decides the RPL of each path based on the selected combination. In the example of Table 2, the first RPL is decided as the inter-AB link, and the second RPL is determined as the inter-DA link. Then, the control unit 213 outputs the RPL decision information to the transmission/reception unit 212. In the example of Table 2, the RPL decision information indicates that the first RPL is the inter-AB link and that the second RPL is the inter-DA link. Note that the RPL decision information may include information indicating the communication direction of each path.

Further, the control unit 213 updates the traffic information table 215. In the example of Table 2, the path of the first path in the traffic information table 215 is updated to A-D-C, and the path of the second path is updated to A-B-C.

Furthermore, the control unit 213 updates the ring configuration information table 217. In the example of Table 2, the ring configuration information of ID1 is updated to set RPL: A-B, clockwise, candidate RPL: C-D, and counterclockwise. The ring configuration information of ID2 is updated to set RPL: D-A, counterclockwise, candidate RPL: B-C, and clockwise.

The transmission/reception unit 212 receives the RPL decision information from the control unit 213. Then, the transmission/reception unit 212 transmits the RPL decision information to the network apparatus A110, the network apparatus B120, the network apparatus C130, and the network apparatus D140.

Figure 9:
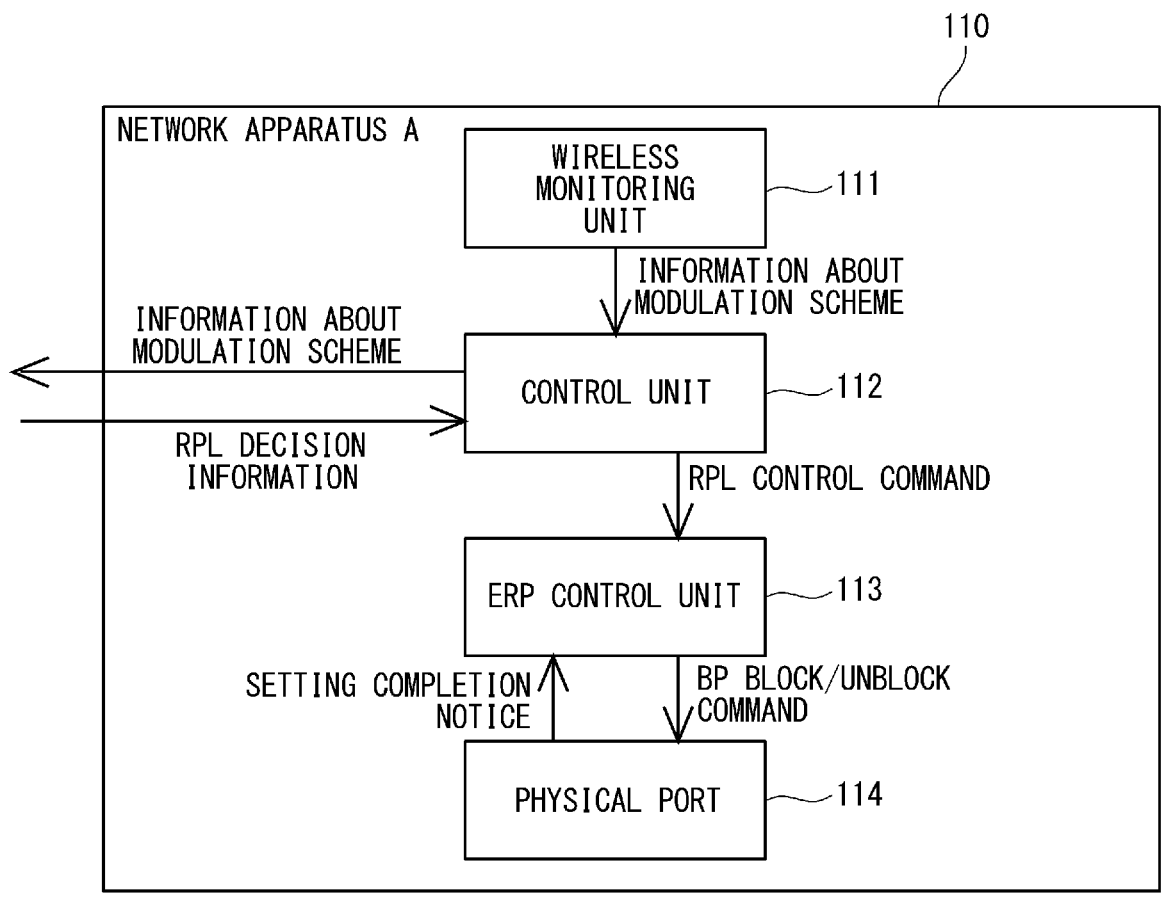
FIG. 9 is a block diagram showing a configuration of a network apparatus according to the second embodiment of the present invention.

Next, the network apparatus A110 according to the second embodiment will be described with reference to the block diagram of FIG. 9. The network apparatus A110 is a relay apparatus that performs wireless communication with P2P using adaptive modulation. The network apparatus B120, the network apparatus C130, and the network apparatus D140 have the same configuration as that of the network apparatus A110, and thus a description thereof is omitted.

The network apparatus A110 includes a wireless monitoring unit 111, a control unit 112, an ERP control unit 113, and a physical port 114.

The wireless monitoring unit 111 monitors changes in the adaptive modulation of the communication in the inter-AB link and the inter-DA link. Further, when the wireless monitoring unit 111 detects the change in the adaptive modulation, the wireless monitoring unit 111 outputs information about the modulation scheme to the control unit 112.

The control unit 112 receives the information about the modulation scheme from the wireless monitoring unit 111. The control unit 112 transmits the received information about the modulation scheme to the monitoring apparatus 210. The control unit 112 also receives the RPL decision information from the monitoring apparatus 210. Further, the control unit 112 outputs an RPL control command to the ERP control unit 113 based on the RPL decision information. For example, in the example of Table 2, the RPL control command is a command to set the first RPL to the inter-AB link and the second RPL to the inter-DA link.

The ERP control unit 113 receives the RPL control command from the control unit 112. Then, the ERP control unit 113 outputs a block/unblock command of the BP to the physical port 114 based on the RPL control command. In the example of Table 2, for the first path, the BP block/unblock command blocks the BP in the inter-AB link and unblocks the BP in the inter-CD link, and for the second path, blocks the BP in the inter-DA link and unblocks the BP in the inter-BC link.

The physical port 114 receives the BP block/unblock command from the ERP control unit 113. Then, the physical port 114 executes block/unblock processing of the BP based on the received BP block/unblock command. Next, the physical port 114 outputs a setting completion notice indicating that the block/unblock processing of the BP has been completed to the ERP control unit 113.

Figure 10:
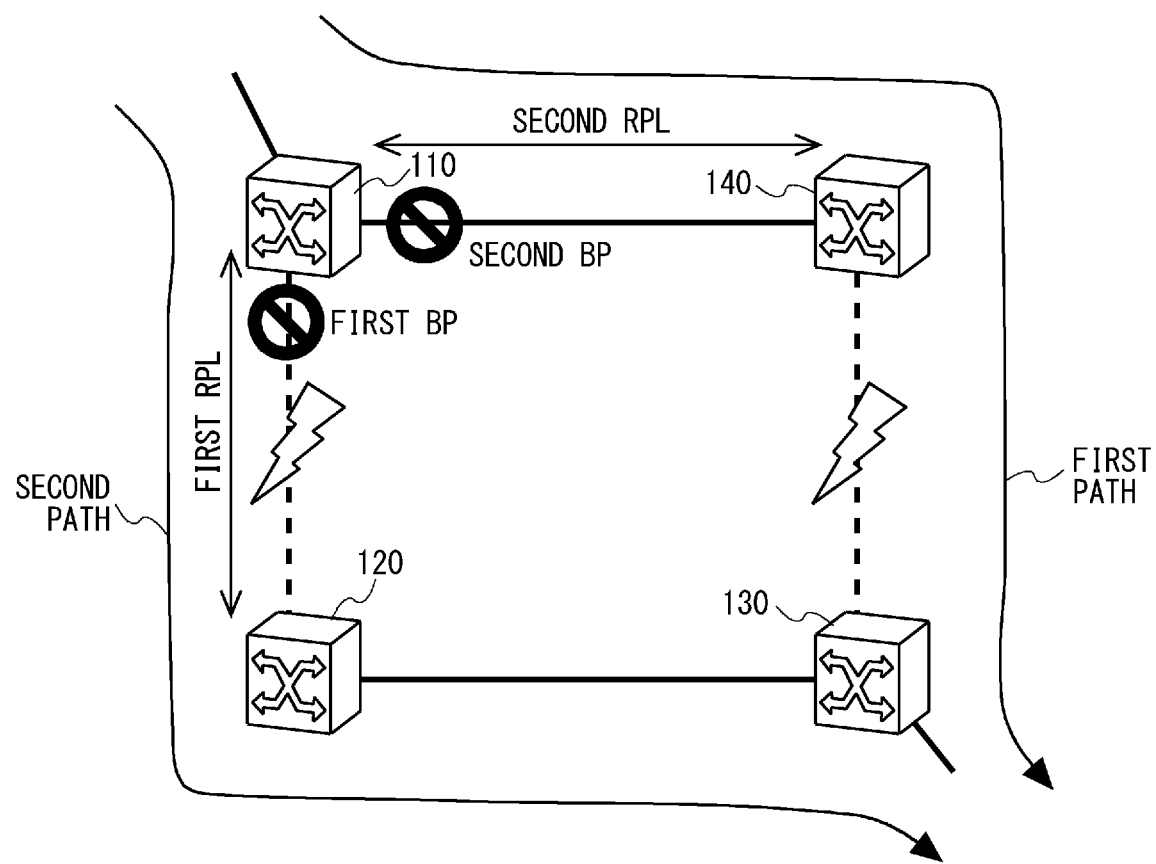
FIG. 10 is a diagram showing an example of a state after re-setting an RPL according to the second embodiment of the present invention.

As shown in FIG. 10, in the network system with the above configuration according to the second embodiment, the first RPL is set to the inter-AB link, and the second RPL is set to the inter-DA link. Further, the first BP is set to the port of the network apparatus A110 in the first RPL, and the second BP is set to the port of the network apparatus A110 in the second RPL. Thus, the first path passes through the path from the network apparatus A110 to the network apparatus C130 via the network apparatus D140. Moreover, the second path passes through the path from the network apparatus A110 to the network apparatus C130 via the network apparatus B120.

Figure 11:
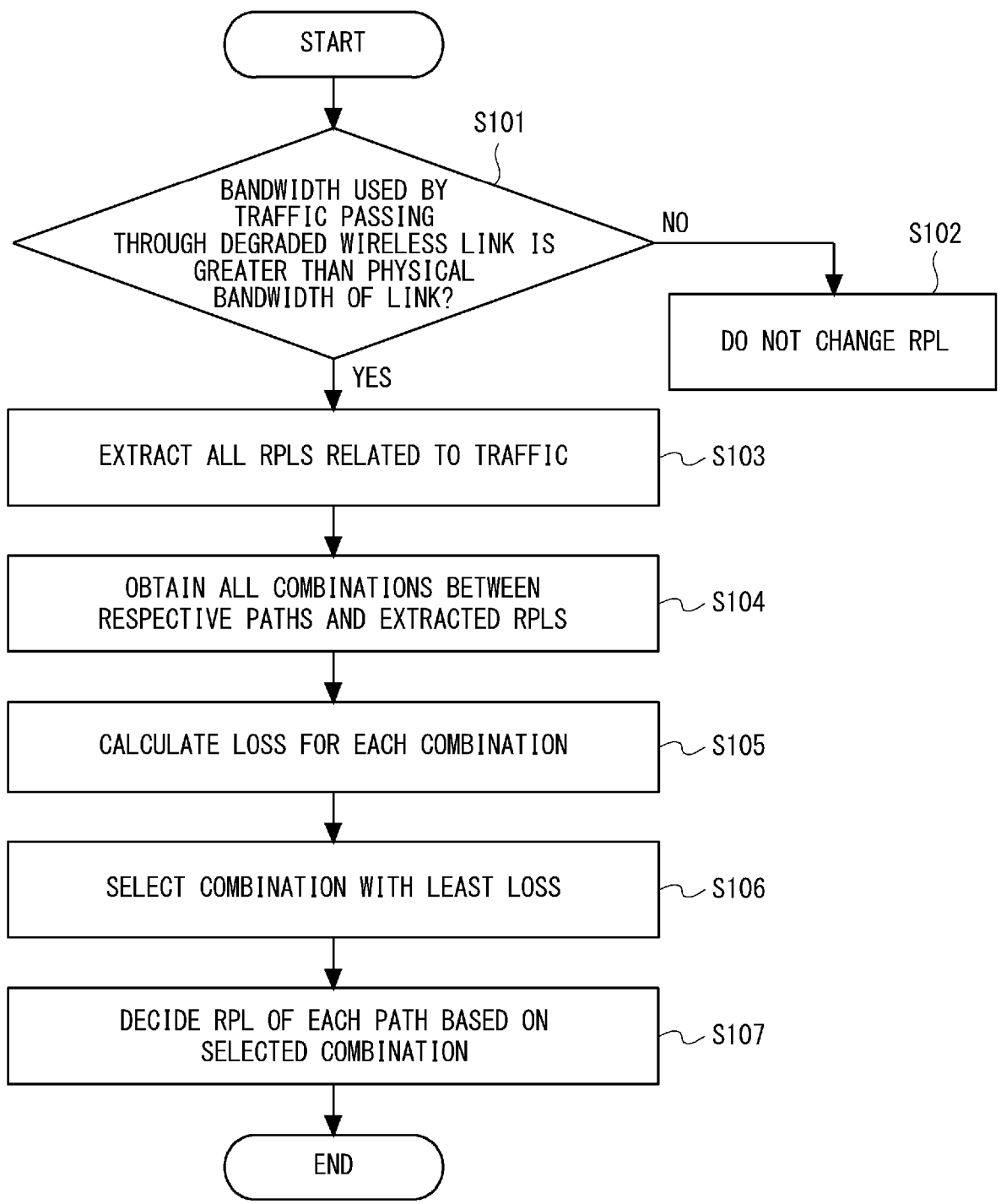
FIG. 11 is a flowchart showing an example of RPL decision processing according to the second embodiment of the present invention.

Next, the processing of the control unit 213 will be described with reference to FIG. 11. First, the control unit 213 determines whether the bandwidth used by the traffic passing through the degraded wireless link is greater than the physical bandwidth of the link (S101). In other words, the control unit 213 determines whether the transmission rate of the traffic will be reduced unless the RPL setting is changed.

In S101, when the control unit 213 determines that the bandwidth used by the traffic passing through the degraded wireless link is less than or equal to the physical bandwidth of the link, it decides not to change the RPL (S102). That is, when the control unit 213 determines that the transmission rate will not be reduced without changing the RPL setting, it decides not to change the RPL.

On the other hand, when the control unit 213 determines that the bandwidth of the traffic passing through the degraded wireless link is greater than the physical bandwidth of the link in S101, all the RPLs related to the traffic are extracted (S103).

Next, the control unit 213 obtains all combinations between the respective paths and the extracted RPLs (S104).

Next, the control unit 213 calculates the loss for each combination (S105).

Next, the control unit 213 selects the combination with the least loss (S106).

Next, the control unit 213 decides the RPL of each path based on the selected combination (S107).

As described above, the monitoring apparatus 210 according to the second embodiment includes the RPL deciding unit 211 that decides the RPL based on the change in the bandwidth of the communication path. This enables changing bandwidths to be effectively used.

The RPL deciding unit 211 according to the second embodiment is configured in such a way that when it evaluates that the transmission rate will be reduced unless the RPL setting is changed, it extracts all the RPLs related to the traffic, obtains all the combinations between the respective paths and the extracted RPLs, calculates the loss for each combination, selects the combination with the least loss, and decides the RPL of each path based on the selected combination. By doing so, it is possible to set the RPL so that the loss is minimized.

Further, the RPL deciding unit 211 according to the second embodiment is configured to also determine whether a link with a greatly degraded physical bandwidth, for example, from 300 Mbps to 50 Mbps, can let the path pass therethrough. Thus, the resources can be optimized.

Third Embodiment

Next, a network system according to a third embodiment of the present invention will be described. The network system according to the third embodiment is a specific example including a technique for reducing the number of path switches in the network system according to the second embodiment. The network system, the monitoring apparatus, and the network apparatus according to the third embodiment are the same as those according to the second embodiment. Thus, the descriptions of them will be omitted.

Figure 12:
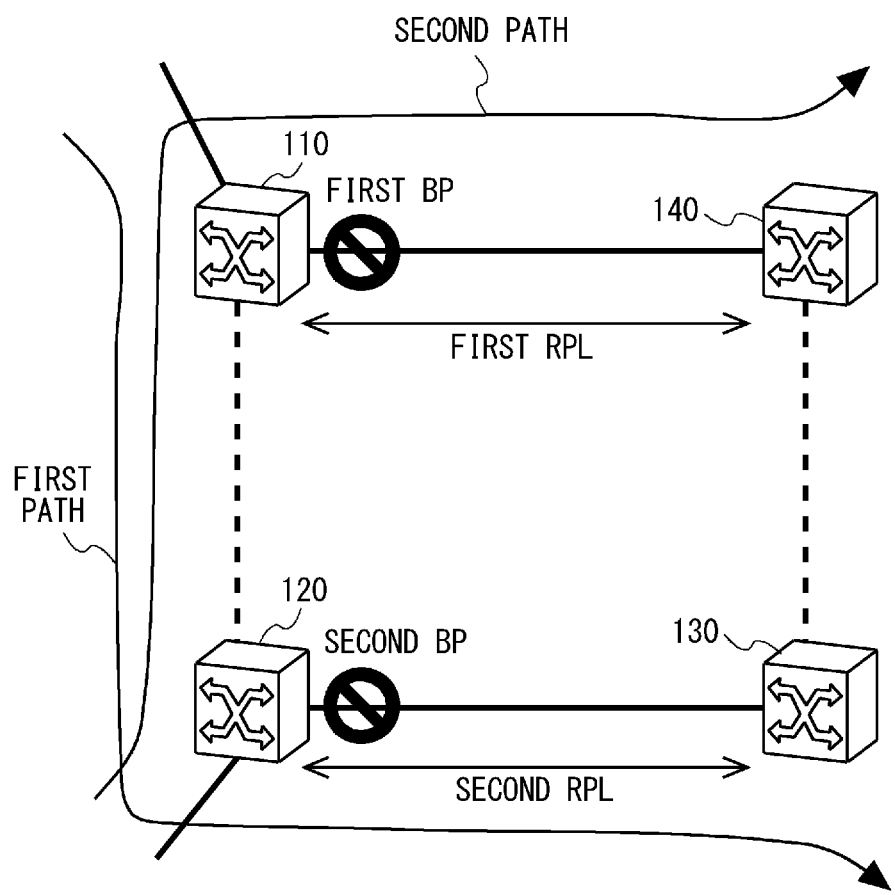
FIG. 12 is a diagram showing an example of a state before a link degrades according to a third embodiment of the present invention.

FIG. 12 is a diagram showing a state before a link degrades. In FIG. 12, an inter-DA link and an inter-BC link are wired links, and an inter-AB link and an inter-CD link are wireless links. Further, a physical bandwidth of the wired link is 1000 Mbps, and a physical bandwidth of the wireless link is 300 Mbps.

In FIG. 12, a first RPL is set to the inter-DA link. Further, a second RPL is set to the inter-BC link. Moreover, a first BP is set to a port of the network apparatus A110 in the first RPL, and a second BP is set to a port of the network apparatus B120 in the second RPL.

In FIG. 12, a first path is set to a path from the network apparatus A110 to the network apparatus C130 via the network apparatus B120. A second path is set to a path from the network apparatus B120 to the network apparatus D140 via the network apparatus A110. The bandwidth used by the first path is 250 Mbps, and the bandwidth used by the second path is 50 Mbps.

Figure 13:
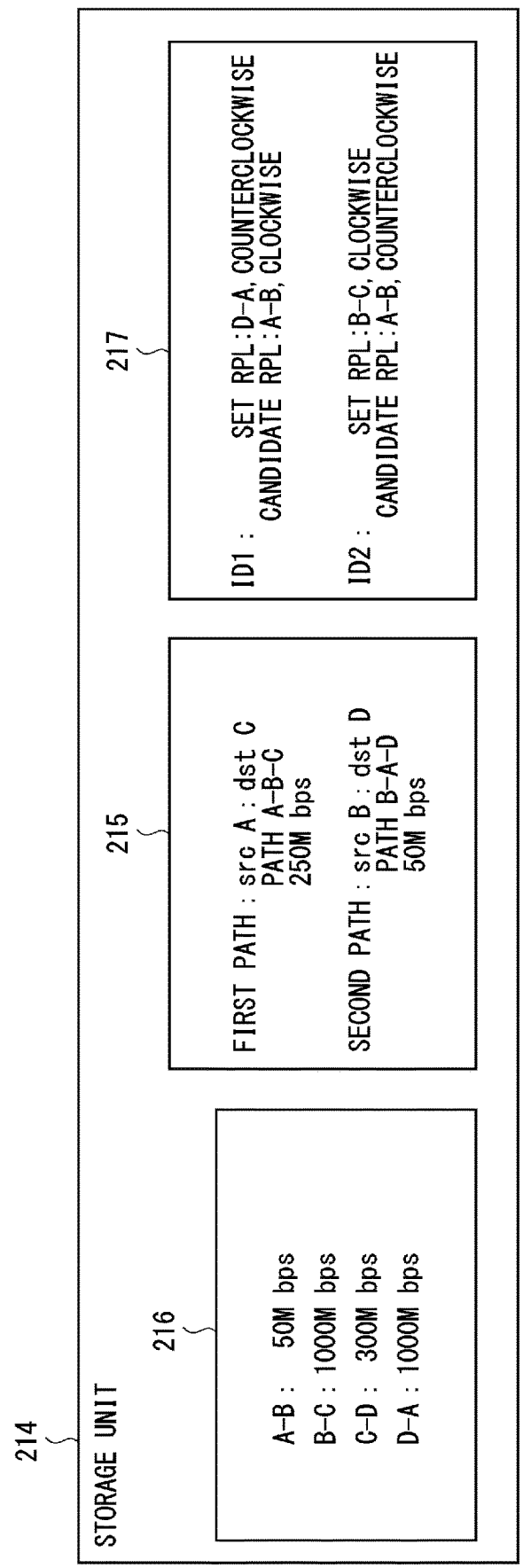
FIG. 13 is a diagram showing an example of each table included in a storage unit of a monitoring apparatus according to the third embodiment of the present invention.

A case where the physical bandwidth of the inter-AB link degrades from 300 Mbps to 50 Mbps in the state of FIG. 12 will be described. FIG. 13 shows an example of each table included in the storage unit in a state in which the network configuration information table is updated due to the change in the physical bandwidth.

The control unit 213 calculates the loss for each combination based on the traffic information, the physical bandwidth information, and the ring configuration information. Table 3 shows the relationship between the respective combinations and losses calculated based on the traffic information, the physical bandwidth information, and the ring configuration information in FIG. 13.

TABLE 3

| Combination | Path | RPL | Loss | Sum of loss |
|---|---|---|---|---|
| 1 | 1 | D-A | 200 | 250 |
|  | 2 | B-C | 50 |  |
| 2 | 1 | D-A | 200 | 200 |
|  | 2 | A-B | 0 |  |
| 3 | 1 | A-B | 0 | 0 |
|  | 2 | B-C | 0 |  |
| 4 | 1 | A-B | 0 | 0 |
|  | 2 | A-B | 0 |  |

In the first path of the combination 1, the RPL is D-A, and the communication direction is counterclockwise according to the ring configuration information. Therefore, the first path of the combination 1 passes through the inter-AB link and the inter-BC link. The bandwidth used by the first path in the traffic information is 250 Mbps. The physical bandwidth of the inter-AB link is 50 Mbps, and the physical bandwidth of the inter-BC link is 1000 Mbps. Thus, the first path of the combination 1 can pass only 50 Mbps of 250 Mbps of the bandwidth used through the inter-AB link, with a loss of 200 Mbps.

In the second path of the combination 1, the RPL is B-C, and the communication direction is clockwise according to the ring configuration information. Therefore, the second path of the combination 1 passes through the inter-AB link and the inter-DA link. The bandwidth used by the second path in the traffic information is 50 Mbps. The physical bandwidth of the inter-AB link is 50 Mbps, and the physical bandwidth of the inter-DA link is 1000 Mbps. However, the physical bandwidth of 50 Mbps of the inter-AB link has already been used in the first path, and thus the remaining physical bandwidth is 0 Mbps. Therefore, the second path of the combination 1 cannot pass 50 Mbps of the used bandwidth at all through the inter-AB link, with a loss of 50 Mbps.

Accordingly, the sum of the losses of the combination 1 is 250 Mbps, which is obtained by adding 200 Mbps and 50 Mbps.

In the first path of the combination 2, the RPL is D-A. Thus, like the first path of the combination 1, the loss is 200 Mbps.

In the second path of the combination 2, the RPL is A-B, and the communication direction is counterclockwise according to the ring configuration information. Therefore, the second path of the combination 2 passes through the inter-BC link and the inter-CD link. The bandwidth used by the second path in the traffic information is 50 Mbps. The physical bandwidth of the inter-BC link is 1000 Mbps, and the physical bandwidth of the inter-CD link is 300 Mbps. Thus, the second path of the combination 2 passes through the inter-BC link and the inter-CD link without a loss.

Accordingly, the sum of the losses of the combination 2 is 200 Mbps, which is obtained by adding 200 Mbps and 0 Mbps.

In the first path of the combination 3, the RPL is A-B, and the communication direction is clockwise according to the ring configuration information. Therefore, the first path of the combination 3 passes through the inter-DA link and the inter-CD link. The bandwidth used by the first path in the traffic information is 250 Mbps. The physical bandwidth of the inter-DA link is 1000 Mbps, and the physical bandwidth of the inter-CD link is 300 Mbps. Thus, the first path of the combination 3 passes through the inter-DA link and the inter-CD link without a loss.

In the second path of the combination 3, the RPL is B-C, and the communication direction is clockwise according to the ring configuration information. Therefore, the second path of the combination 3 passes through the inter-AB link and the inter-DA link. The bandwidth used by the second path in the traffic information is 50 Mbps. The physical bandwidth of the inter-AB link is 50 Mbps, and the physical bandwidth of the inter-DA link is 1000 Mbps. Thus, the second path of the combination 3 passes through the inter-AB link and the inter-DA link without a loss.

Accordingly, the sum of the losses of the combination 3 is 0 Mbps, which is obtained by adding 0 Mbps and 0 Mbps. That is, no loss is generated in the combination 3.

In the first pass of the combination 4, the RPL is A-B. Thus, like the first path of the combination 3, no loss is generated.

In the second path of the combination 4, the RPL is A-B, and the communication direction is counterclockwise according to the ring configuration information. Therefore, the second path of the combination 4 passes through the inter-BC link and the inter-CD link. The bandwidth used by the second path in the traffic information is 50 Mbps. The physical bandwidth of the inter-BC link is 1000 Mbps, and the physical bandwidth of the inter-CD link is 300 Mbps. 250 Mbps out of 300 Mbps of the physical bandwidth of the inter-CD link has already been used in the first path. However, the physical bandwidth of the inter-CD link is 50 Mbps. Thus, the second path of the combination 4 passes through the inter-BC link and the inter-CD link without a loss.

Accordingly, the sum of the losses of the combination 4 is 0 Mbps, which is obtained by adding 0 Mbps and 0 Mbps. That is, no loss is generated in the combination 4.

The control unit 213 selects the combination with the least loss. In the example of Table 3, it is found that there are two combinations with the least loss, which are the combination 3 and combination 4. In this case, a method of determining which one of the combination 3 and combination 4 has a smaller number of path switches and selecting the combination with the smaller number of path switches is used.

The reason for using this method is as follows. The path switching is defined by the standard of ERP that it should be performed within 50 ms (e.g., see Non Patent Literature 1). However, packets are dropped even during the switching within 50 ms. For this reason, the number of path switches is preferably as small as possible. Therefore, the combination with a smaller number of path switches is selected from among the combinations with the same loss.

Figure 14:
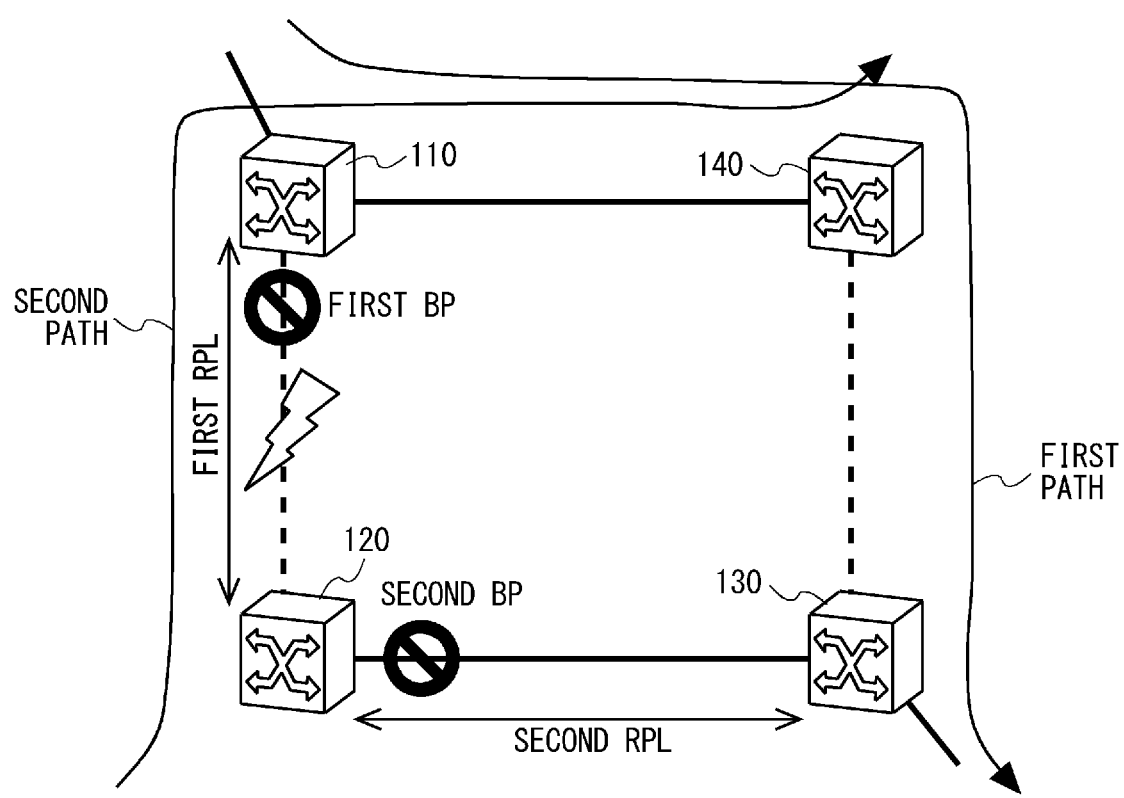
FIG. 14 is a diagram showing an example of a state after re-setting an RPL when a combination 3 is selected according to the third embodiment of the present invention.
Figure 15:
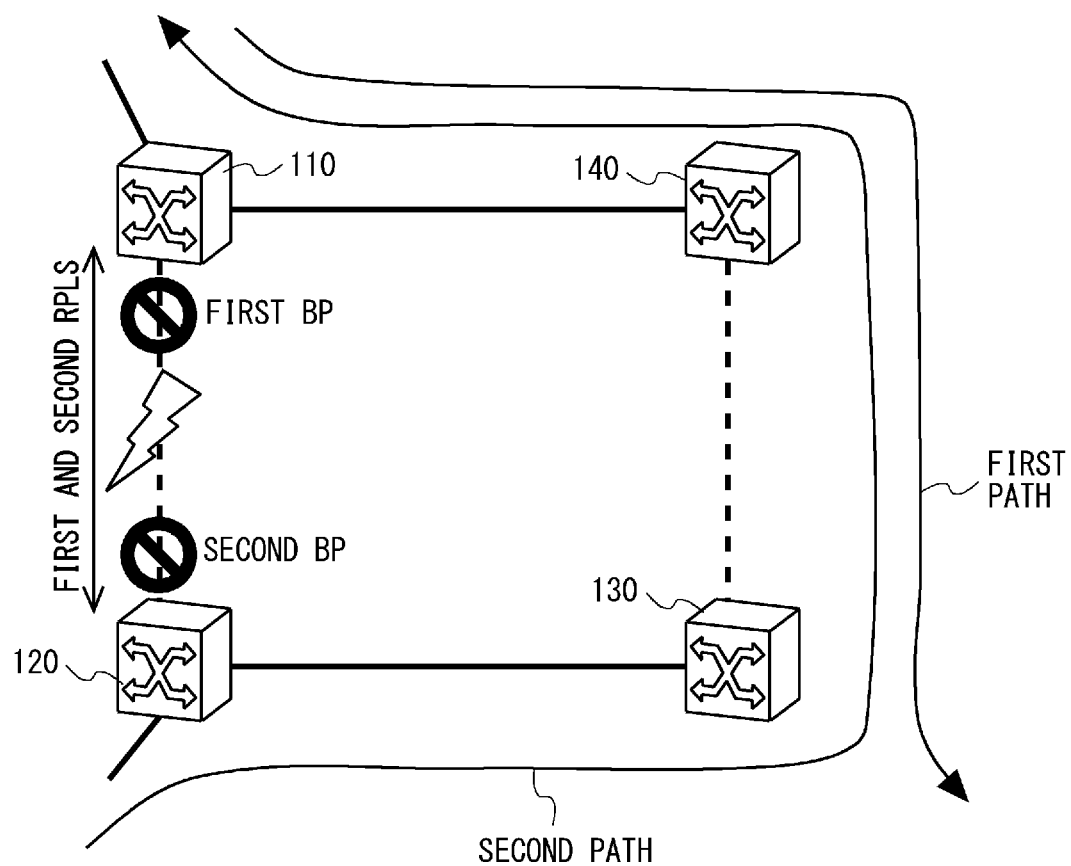
FIG. 15 is a diagram showing an example of a state after re-setting an RPL when a combination 4 is selected according to the third embodiment of the present invention.

In the combination 3, as shown in FIG. 14, only the first path is switched from the state of FIG. 12, and the second path cannot be switched. As shown in FIG. 15, in the combination 4, both the first path and the second path are switched from the state of FIG. 12. Therefore, in this example, the control unit 213 selects the combination 3 with a smaller number of path switches.

The control unit 213 decides the RPL of the first path as the inter-AB link and the RPL of the second path as the inter-BC link. Further, the control unit 213 outputs, to the transmission/reception unit 212, the RPL decision information indicating that the first RPL is the inter-AB link, i.e., to change the first RPL to the inter-AB link. Then, the transmission/reception unit 212 transmits the received RPL decision information to the network apparatus. Thus, the first RPL is changed to the inter-AB link, and the first BP is changed to the port of the network apparatus A110 in the first RPL.

As described above, the monitoring apparatus 210 according to the third embodiment is configured to select, when there are a plurality of combinations with the least loss, a combination with a smaller number of path switches. Thus, it is possible to set the RPL in such a way that the loss is minimized and the number of path switches is reduced.

The processes of the abovementioned embodiments may be executed by software. That is, a computer program for executing the processes may be read by a CPU (Central Processing Unit) included in the monitoring apparatus so that the computer program will be executed. The same processes as those described in the above embodiments can be executed by using the program that executes the processes. The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present invention has been described with reference to the embodiments. However, the present invention is not limited by the above-described embodiments. Various changes that can be understood by those skilled in the art within the scope of the invention can be made to the configurations and details of the present invention.

For example, in the above embodiments, the physical bandwidth of the wireless link is calculated from the multi-value number of the adaptive modulation as an example. However, the present invention is not limited to this, and instead the physical bandwidth of the wireless link may be calculated from information about the state of the communication path. Additionally, the monitoring apparatus may receive information about the physical bandwidth instead of the information about the adaptive modulation from the network apparatus such as the relay apparatus.

The whole or part of the embodiments disclosed above can be described as, but not limited to, the following supplementary notes.

(Supplementary Note 1)
A monitoring apparatus for setting an RPL (Ring Protection Link) to each network apparatus constituting a communication network by ERP (Ethernet Ring Protection), the monitoring apparatus comprising RPL deciding unit for deciding an RPL based on a change in a bandwidth of a communication path.

(Supplementary Note 2)
The monitoring apparatus according to Supplementary note 1, wherein when the RPL deciding unit evaluates that a transmission rate will not be reduced even without changing a setting of the RPL based on the change in the physical bandwidth of the communication path and a bandwidth used by traffic, it decides not to change the RPL, while when it evaluates that the transmission rate will be reduced unless the setting of the RPL is changed, it decides a link to which the RPL is set.

(Supplementary Note 3)
The monitoring apparatus according to Supplementary note 2, wherein the RPL deciding unit also determines whether a link with a greatly degraded physical bandwidth can let a path pass therethrough.

(Supplementary Note 4)
The monitoring apparatus according to Supplementary note 2 or 3, wherein, when the RPL deciding unit evaluates that the transmission rate will be reduced unless the setting of the RPL is changed, it extracts all RPLs related to the traffic, obtains all combinations between the respective paths and the extracted RPLs, calculates a loss for each of the combinations, selects the combination with the least loss, and decides an RPL of each path based on the selected combination.

(Supplementary Note 5)
The monitoring apparatus according to Supplementary note 4, wherein when there are a plurality of the combinations with the least loss, the RPL deciding unit selects the combination with a smaller number of path switches.

(Supplementary Note 6)
An RPL decision method in a monitoring apparatus for setting an RPL (Ring Protection Link) to each network apparatus constituting a communication network by ERP (Ethernet Ring Protection), the RPL decision method comprising a step of deciding an RPL based on a change in a bandwidth of a communication path.

(Supplementary Note 7)
The RPL decision method according to Supplementary note 6, wherein the step of deciding the RPL comprises:
a step of, when it is evaluated that a transmission rate will not be reduced even without changing a setting of the RPL based on the change in the physical bandwidth of the communication path and a bandwidth used by traffic, deciding not to change the RPL; and
a step of, when it is evaluated that the transmission rate will be reduced unless the setting of the RPL is changed based on the change in the physical bandwidth of the communication path and a bandwidth used by traffic, deciding a link to which the RPL is set.

(Supplementary Note 8)
The RPL decision method according to Supplementary note 7, wherein the step of deciding the RPL comprises determining whether a link with a greatly degraded physical bandwidth can let a path pass therethrough.

(Supplementary Note 9)
The RPL decision method according to Supplementary note 7 or 8, wherein the step of deciding the link to which the RPL is set comprises:
a step of extracting all RPLs related to the traffic;
a step of obtaining all combinations between the respective paths and the extracted RPLs;
a step of calculating a loss for each of the combinations;
a step of selecting the combination with the least loss; and
a step of deciding an RPL of each path based on the selected combination.

(Supplementary Note 10)
The RPL decision method according to Supplementary note 9, wherein the step of deciding the link to which the RPL is set further comprises a step of selecting, when there are a plurality of the combinations with the least loss, the combination with a smaller number of path switches.

(Supplementary Note 11)
A program for causing a computer to execute an RPL decision method in a monitoring apparatus for setting an RPL (Ring Protection Link) to each network apparatus constituting a communication network by ERP (Ethernet Ring Protection), the RPL decision method comprising a step of deciding an RPL based on a change in a bandwidth of a communication path.

(Supplementary Note 12)
A relay apparatus performing wireless communication with P2P (Point to Point) using adaptive modulation, wherein the relay apparatus
transmits information about a modulation scheme to a monitoring apparatus, and
receives an RPL (Ring Protection Link) based on the modulation scheme from the monitoring apparatus.

REFERENCE SIGNS LIST

101 to 104, 110 to 140 NETWORK APPARATUS
200 MONITORING APPARATUS
201 RPL DECIDING UNIT

The invention claimed is:

1. A monitoring apparatus for setting an RPL (Ring Protection Link) to each network apparatus constituting a communication network by ERP (Ethernet Ring Protection), the monitoring apparatus comprising:
   hardware, including a processor and a memory;
   RPL deciding unit that is implemented at least by the hardware and configured to decide an RPL based on a change in a bandwidth of a communication path,
   wherein when the RPL deciding unit evaluates that a transmission rate will not be reduced even without changing a setting of the RPL based on the change in the physical bandwidth of the communication path and a bandwidth used by traffic, the RPL deciding unit decides not to change the RPL, while when the RPL deciding unit evaluates that the transmission rate will be reduced unless the setting of the RPL is changed, the RPL deciding unit decides a link to which the RPL is set,
   wherein, when the RPL deciding unit evaluates that the transmission rate will be reduced unless the setting of the RPL is changed, the RPL deciding unit extracts all RPLs related to the traffic, calculates a loss for each of the combinations of RPLs corresponding to the paths respectively, selects the combination with the least loss, and decides an RPL of each path based on the selected combination, and
   wherein when there are a plurality of the combinations with the least loss, the RPL deciding unit selects the combination with a smaller number of path switches.

2. The monitoring apparatus according to claim 1, wherein the RPL deciding unit also determines whether a link with a greatly degraded physical bandwidth can let a path pass therethrough.

3. An RPL decision method in a monitoring apparatus for setting an RPL (Ring Protection Link) to each network apparatus constituting a communication network by ERP (Ethernet Ring Protection), the RPL decision method comprising deciding an RPL based on a change in a bandwidth of a communication path,
   wherein the deciding of the RPL comprises:
      deciding not to change the RPL, when a transmission rate will not be reduced even without changing a setting of the RPL based on the change in the physical bandwidth of the communication path and a bandwidth used by traffic; and
      deciding a link to which the RPL is set, when the transmission rate will be reduced unless the setting of the RPL is changed based on the change in the physical bandwidth of the communication path and the bandwidth used by traffic,
   wherein the deciding of the link to which the RPL is set comprises:
      extracting all RPLs related to the traffic;
      calculating a loss for each of the combinations of RPLs corresponding to the paths respectively;
      selecting the combination with the least loss; and
      deciding an RPL of each path based on the selected combination,
   wherein the deciding of the link to which the RPL is set further comprises selecting, when there are a plurality of the combinations with the least loss, the combination with a smaller number of path switches.

4. The RPL decision method according to claim 3, wherein the deciding of the RPL comprises determining whether a link with a greatly degraded physical bandwidth can let a path pass therethrough.

5. A non-transitory computer readable medium storing a program for causing a computer to execute an RPL decision method in a monitoring apparatus for setting an RPL (Ring Protection Link) to each network apparatus constituting a communication network by ERP (Ethernet Ring Protection), the RPL decision method comprising deciding an RPL based on a change in a bandwidth of a communication path,
   wherein the deciding of the RPL comprises:
      deciding not to change the RPL, when a transmission rate will not be reduced even without changing a setting of the RPL based on the change in the physical bandwidth of the communication path and a bandwidth used by traffic; and
      deciding a link to which the RPL is set, when the transmission rate will be reduced unless the setting of the RPL is changed based on the change in the physical bandwidth of the communication path and the bandwidth used by traffic,
   wherein the deciding of the link to which the RPL is set comprises:
      extracting all RPLs related to the traffic;
      calculating a loss for each of the combinations of RPLs corresponding to the paths respectively;
      selecting the combination with the least loss; and
      deciding an RPL of each path based on the selected combination,
   wherein the deciding of the link to which the RPL is set further comprises selecting, when there are a plurality of the combinations with the least loss, the combination with a smaller number of path switches.

* * * * *